Jan. 15, 1952     E. W. MOORE     2,582,390
TIRE REMOVING APPARATUS OF THE PERCUSSION TYPE
Filed July 31, 1946
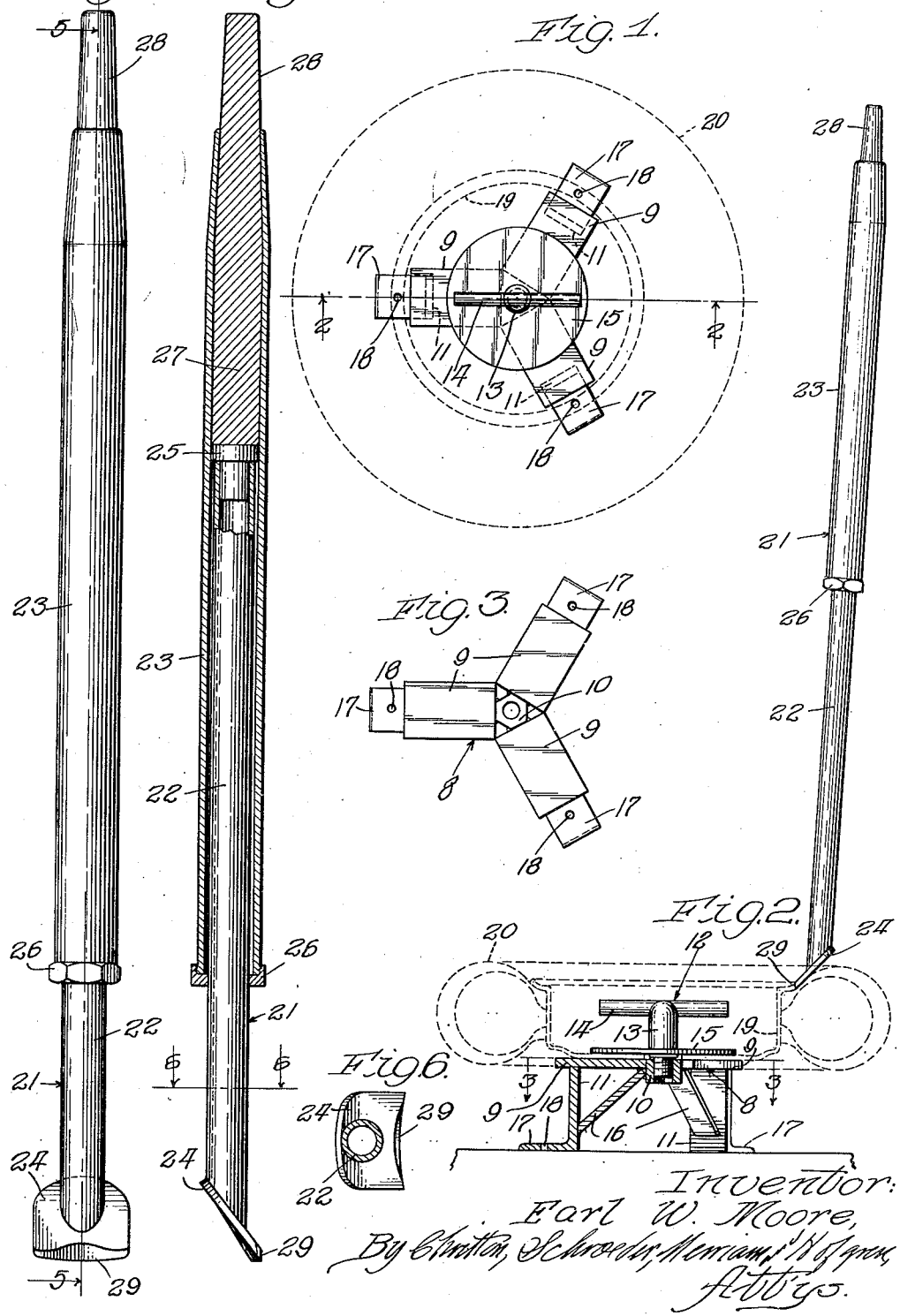

UNITED STATES PATENT OFFICE 2,582,390

TIRE REMOVING APPARATUS OF THE PERCUSSION TYPE

Earl W. Moore, Oelwein, Iowa, assignor to Earl W. Moore and Harry A. Wardell, doing business as Wardell-Moore Machine Company Application July 31, 1946, Serial No. 687,255

2 Claims. (Cl. 157—1.17)

This invention relates to an improved apparatus for removing pneumatic tires from wheels.

The biggest continuing problem in tire repair work has been the removal of the tire from the wheel rim, and this problem has been especially difficult in the case of heavy bus and truck tires which are stiff and tend to stick to the rim.

This invention solves the problem by using a specially constructed slip ram in combination with a pedestal of such dimensions that the tire can be knocked off the wheel by action of the ram. The invention furnishes an inexpensive and portable device for doing a job which has formerly been performed either with unsatisfactory prying tools and hand hammers, or with very expensive and heavy equipment containing hydraulic or pneumatic jacks.

The preferred embodiment of the invention is illustrated in the drawings, in which:

Fig. 1 is a plan view of the wheel pedestal with the wheel lock in place, and a wheel and tire dotted in;

Fig. 2 is a sectional view at the line 2—2 of Fig. 1 with the tire removing member in operating position;

Fig. 3 is a plan view of the pedestal with the wheel lock removed;

Fig. 4 is a side elevation of the tire removing member;

Fig. 5 is a sectional view at the line 5—5 of Fig. 4, and

Fig. 6 is a sectional view at the line 6—6 of Fig. 5.

Referring to the drawings in greater detail, the preferred embodiment includes a wheel pedestal 8, consisting of a top 9 formed of radial metal plates and having an integral, centrally disposed nut 10 therein, and a plurality of legs 11 supporting said top; and a wheel lock 12 adapted to screw into the nut 10, said wheel lock being composed of a threaded bolt 13 which has a handle 14 at one of its ends, and a disc 15 which is preferably rotatably mounted in an annular groove in the bolt. For greater strength the pedestal 8 has angle braces 16, and each leg preferably has a flat foot 17 which increases the area of floor contact and permits fastening the base to the floor by means of bolts through the holes 18. The top 9 must be of such width, and the legs 11 of such length, that when a wheel, as 19, is fastened to the base, a tire, as 20, can drop free of the wheel. The wheel 19 and the tire 20 are dotted into the drawings to show the mode of operation of the apparatus.

The tire removing member 21 is a slip ram, and includes a preferably tubular shaft 22, and a pipe 23, slidable on the shaft. The shaft 22 has a tire driving plate 24 projecting laterally from one of its ends at an angle of about 40° to its axis, and has an enlarged cap 25, at its opposite end forming an anvil to receive blows from the pipe 23. The angle of the tire driving plate 24 is not critical, but the stated angle of about 40° provides for substantially the maximum area of contact between the plate and the side wall of a tire, as 20, when the member 21 is held substantially vertical, and permits the plate to slide easily between the tire bead and the wheel rim without any tendency to cut the bead. The opening of the pipe 23 at the end toward the tire engaging portion 24 is reduced in size by an open cap 26, which coacts with the cap 25 to limit the slide of the pipe and prevent its separation from the shaft. The opposite end of the pipe is closed by an elongated plug 27 which is held in place by swaging the tube end and which terminates exteriorly of the tube in a handle 28. The combined shaft and tube should be of such length that a man of average size can readily slide the pipe to its most extended position when the member 21 is held substantially vertical, with the plate 24 resting on the sidewall of a tire on the pedestal 7.

The plate 24 must be of sufficient area to avoid damage to a tire sidewall, and is most efficient when its structure is substantially as follows: Its lateral projection from the shaft 22 is sufficient that when it has been driven between the wheel rim and the tire bead, its forward edge 29 will contact the wheel surface and slide across that surface, preventing the shaft 22 from contacting the rim; its surface is slightly convex with respect to the shaft in order to provide the maximum area of contact with the tire sidewall; and its forward edge 29 is wedge shaped and is arcuate on an arc of radius equal to the wheel radius of the average vehicle wheel (about 8 inches). Thus when the member 21 is in use, a blow delivered to the shaft 22 by the pipe 23, tends to slide the plate 24 between the rim and the tire bead, the shape of the forward edge 29 being such as to give a wedging action with the lip of the rim, which is usually circular in cross section.

The operation of the apparatus is obvious in the light of the above description. A vehicle wheel 19 is placed on the pedestal 8, and secured thereto by screwing down the wheel lock 12. The operator holds the tire removing member 21 by the pipe 23, and places the plate 24 on the sidewall of the tire 20, with the forward edge 29, of the plate, in contact with the wheel rim. The pipe 23 is raised to its extended position, and rammed down upon the shaft 22 to deliver a directed blow to the tire 20, which wedges the plate 24 between the tire 20 and the rim and starts the tire off the wheel. A number of such blows, directed at various points on the tire sidewall, will drive the tire off the wheel.

I claim:

1. The combination of a slip ram with a tire removing tool, said tool comprising an elongated shaft provided with a smooth outer bearing surface for the ram, a tire driving plate projecting laterally from one end of the shaft at an angle such that the plate lies substantially flat against the sidewall of a tire when the shaft is substantially perpendicular to the plane of the tire, said plate having a blunt forward edge which is wedge shaped in cross section and said plate having a downwardly convex bottom with the convexity of the bottom extending from side to side of the plate substantially parallel to said forward edge whereby to distribute the ramming force applied to the shaft by the slip ram uniformly over a large circumferential area of the tire.

2. The combination of a slip ram with a tire removing tool, said tool comprising an elongated shaft provided with a smooth outer bearing surface for the ram, a tire driving plate projecting laterally from one end of the shaft at an angle such that the plate lies substantially flat against the sidewall of a tire when the shaft is substantially perpendicular to the plane of the tire, said plate having a blunt forward edge which is wedge shaped in cross section and said plate having a downwardly convex bottom with the convexity of the bottom extending from side to side of the plate substantially parallel to said forward edge whereby to distribute the ramming force applied to the shaft by the slip ram uniformly over a large circumferential area of the tire, in combination with a support to hold a vehicle wheel adapted to permit a tire to drop free of the wheel, said support having a top, means for supporting the top above a base a distance at least equal to the thickness of a tire, a central threaded aperture in the top, and a locking member to lock the wheel to the support, said locking member including a bolt provided with threads at one end to engage the threads in the aperture, and a disc mounted on the bolt and adapted to engage the wheel to hold the same against the top.

EARL W. MOORE.

REFERENCES CITED

The following references are of record in the file of this patent:

UNITED STATES PATENTS

| Number | Name | Date |
| --- | --- | --- |
| 584,189 | Nelson | June 8, 1897 |
| 948,230 | Lestage | Feb. 1, 1910 |
| 1,082,379 | West | Dec. 23, 1913 |
| 1,137,555 | Turnbull | Apr. 27, 1915 |
| 1,519,558 | Snider | Dec. 16, 1924 |
| 1,615,469 | McKenzie | Jan. 25, 1927 |
| 1,646,511 | Weaver et al. | Oct. 25, 1927 |
| 1,684,446 | Inglis | Sept. 18, 1928 |
| 1,969,807 | Leonard | Aug. 14, 1934 |
| 2,034,819 | Maulis | Mar. 24, 1936 |
| 2,226,757 | Ewell | Dec. 31, 1940 |
| 2,294,271 | Bethard | Aug. 25, 1942 |
| 2,399,146 | Schumann | Apr. 23, 1946 |
| 2,455,580 | Hewitt | Dec. 7, 1948 |
| 2,489,088 | Hewitt | Nov. 22, 1949 |